(12) United States Patent
Savagaonkar (10) Patent No.: US 9,158,710 B2
(45) Date of Patent: Oct. 13, 2015

(54) PAGE COLORING WITH COLOR INHERITANCE FOR MEMORY PAGES

(75) Inventor: Uday Savagaonkar, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 2124 days.

(21) Appl. No.: 11/513,984

(22) Filed: Aug. 31, 2006

(65) Prior Publication Data

US 2008/0055617 A1 Mar. 6, 2008

(51) Int. Cl.
 *G06F 12/14* (2006.01)
 *G06F 12/10* (2006.01)

(52) U.S. Cl.
 CPC ........ *G06F 12/1458* (2013.01); *G06F 12/1009* (2013.01); *G06F 12/145* (2013.01); *G06F 2212/653* (2013.01)

(58) Field of Classification Search
 CPC .............. G06F 12/109; G06F 12/1458; G06F 2212/653
 USPC ......................................................... 711/208
 See application file for complete search history.

(56) References Cited

U.S. PATENT DOCUMENTS 4,809,160 A * 2/1989 Mahon et al. ...................... 726/4
6,009,503 A * 12/1999 Liedtke .......................... 711/203

OTHER PUBLICATIONS

Mahon et al., Hewlett Packard Precision Architecture:the Processor, Aug. 1986, Hewlett Packard, 19 pages.*

* cited by examiner

*Primary Examiner* — Gary W Cygiel
(74) *Attorney, Agent, or Firm* — Schubert Law Group PLLC (57) ABSTRACT

Apparatuses, methods, and media for page coloring with color inheritance for memory pages are disclosed. Some embodiments may include an interface to access a memory and a paging unit including translation logic, inheritance logic, and comparison logic. The translation logic translates a first address to a second address based on an entry in a data structure, wherein the first address is provided by an instruction stored in a first page in the memory and the entry includes a base address of a second page in the memory including the second address and a color of the second page. The inheritance logic may determine an effective current page color of the first page based on a color of the first page. The comparison logic may compare the effective current page color of the first page to the color of the second page. Other embodiments are disclosed and claimed.

19 Claims, 3 Drawing Sheets

FIG. 4

PAGE COLORING WITH COLOR INHERITANCE FOR MEMORY PAGES

FIELD

Embodiments of the present invention are in the field of information processing, and, more specifically, to the field of memory management and protection.

BACKGROUND

Memory based attacks are a significant threat to the security of information processing systems. Some such attacks involve storing malicious code, such as a virus or a worm, in the memory of a computer system, then exploiting bugs and/or buffer overflows while running legitimate programs to transfer control to the malicious code. Modern viruses and worms are thus able to breach the user/kernel boundary, causing widespread damage to the IT industry and other users of information processing systems. Security of information processing systems remains a complicated and important problem as intruders continue to develop new techniques to attack systems to cause damage, misappropriate information, or perform other unauthorized tasks.

One approach to preventing this type of attack is to include an "execute disable" bit in a page table entry that may be used to designate pages where data is stored as non-executable, so that malicious code could not be stored as data and subsequently executed within the same physical, linear or logical memory space. However, memory based attack techniques are becoming increasingly sophisticated, and additional approaches to preventing such attacks may be desired. This includes protections from buffer overflows that execute existing code or corrupt memory, malicious kernel or application components, rootkits, spyware, and computer viruses. It also includes protections from buggy code such as runaway pointers that corrupt data in other programs or subprograms within a linear address space.

BRIEF DESCRIPTION OF THE DRAWINGS

Embodiments of the invention may be illustrated by way of example, and not by way of limitation, in the following detailed description and in figures of the accompanying drawings in which like references may indicate similar elements.

DETAILED DESCRIPTION OF EMBODIMENTS

The following is a detailed description of example embodiments of the invention depicted in the accompanying drawings. The example embodiments are introduced in such detail as to clearly communicate the invention. However, the embodiments presented herein are merely illustrative, and are not intended to limit the anticipated variations of such embodiments; on the contrary, the intention is to cover all modifications, equivalents, and alternatives falling within the spirit and scope of the appended claims. The detailed descriptions below are designed to make such embodiments obvious to those of ordinary skill in the art. In the following description, numerous specific details such as processor and system configurations are set forth in order to provide a more thorough understanding of the present invention. It will be appreciated, however, by one skilled in the art that the invention may be practiced without such specific details. Additionally, some well known structures, circuits, and the like have not been shown in detail, to avoid unnecessarily obscuring embodiments of the present invention.

Generally speaking, apparatuses, methods, and media for page coloring with color inheritance for memory pages are disclosed. Some embodiments may include an interface to access a memory and a paging unit including translation logic, inheritance logic, and comparison logic. The translation logic translates a first address to a second address based on an entry in a data structure, wherein the first address is provided by an instruction stored in a first page in the memory and the entry includes a base address of a second page in the memory including the second address and a color of the second page. The inheritance logic may determine an effective current page color of the first page based on a color of the first page. The comparison logic may compare the effective current page color of the first page to the color of the second page.

Other embodiments may include a method comprising comparing an effective current page color of a first page to a color of a second page. Embodiments of the method may also include allowing an instruction from the first page to access the second page if the effective current page color of the first page is the same as the color of the second page. In a further embodiment, the method may also include setting the effective current page color of the first page based on a color of the first page by setting the effective current page color to a previous different page color if the first page color is an inheritance color or by setting the effective current page color to the first page color if it is not an inheritance color.

Other embodiments comprise an article comprising a machine-readable medium that contains instructions, which when executed by a processing platform, cause said processing platform to perform a series of operations. Embodiments may include a series of operations for allowing an instruction from the first page to access the second page if the effective current page color of the first page is the same as the color of the second page.

Other embodiments may include a system including a dynamic random access memory and a processor having a paging unit in communication with the memory. The paging unit may include translation logic, inheritance logic, and comparison logic. The translation logic translates a first address to a second address based on an entry in a data structure, wherein the first address is generated by an instruction. stored in a first page in the memory and the entry includes a base address of a second page in the memory including the second address and a color of the second page. The inheritance logic may determine an effective current page color of the first page based on a color of the first page. The comparison logic may compare the effective current page color of the first page to the color of the second page.

The disclosed system and methodology may advantageously provide for facilitating system utility calls and other functions in a page coloring system that generally prevents access of code with one protected color by code of another color. By utilizing the disclosed methodology, a system utility call may "inherit" the page color of the code that is calling it and this inherited color may be used for purposes of access-control instead of the page color of the system utility call. The inherited page color may thus allow the system utility call to access and modify data structures of the calling code even though those data structures are colored with a protected color different from that of the system utility call. A function with an inheritance color may thus serve code having a wide variety of protected colors, avoiding the need to make such functions have supervisory colors that may result in increased security risks.

Figure 1:
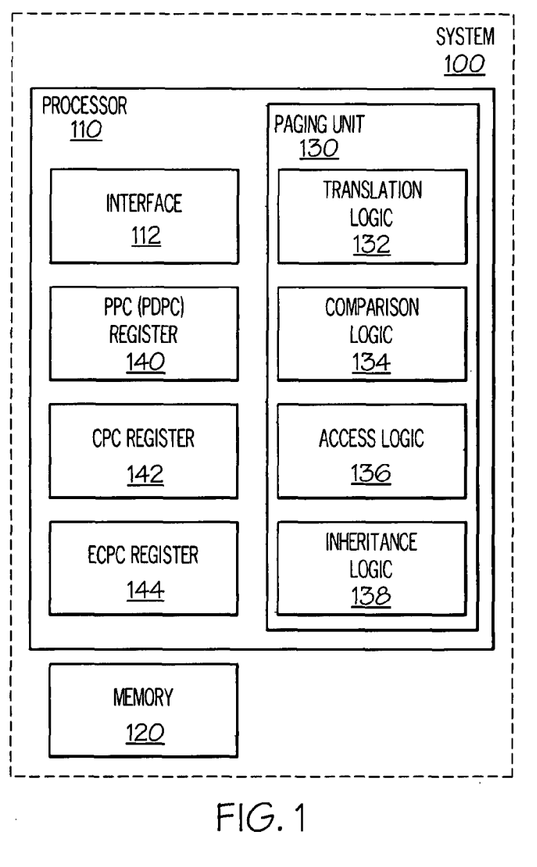
FIG. 1 depicts a processor according to some embodiments including logic for page coloring to associate memory pages with programs and to provide color inheritance functionality.

Turning now to the drawings, FIG. 1 depicts a processor according to some embodiments including logic for page coloring to associate memory pages with programs and to provide color inheritance functionality. Processor 110 is shown in system 100, which also includes memory 120. Processor 110 may be any of a variety of different types of processors, such as a processor in the Pentium® Processor Family, the Itanium® Processor Family, or other processor family from Intel Corporation, or any other general purpose or other processor from another company or organization. Although FIG. 1 illustrates the invention embodied in a processor, the invention may alternatively be embodied in any other type of data processing component or apparatus. Memory 120 may include static or dynamic random access memory, semiconductor-based read only or flash memory, magnetic or optical disk memory, any other type of medium readable by processor 120, or any combination of such mediums.

In the embodiment depicted in FIG. 1, processor 110 includes interface 112, paging unit 130, and one or more registers. Interface 112 may be a bus unit or any other unit, port, or interface to allow processor 110 to communicate with memory 120 through any type of bus, point to point, or other connection, directly or through any other component, such as a chipset or memory controller. Paging unit 130 may include translation logic 132, comparison logic 134, access logic 136, and inheritance logic 138. Translation logic 132 performs address translation and comparison logic is to compare page colors, as will be described below. Also as described below, access logic 136 prevents, allows, or otherwise manages access to specific pages based on page color of those pages. Inheritance logic 138 may, in possible cooperation with access logic 136 and/or comparison logic 134, determine an effective current page color for a page to facilitate inheritance of a color from another page to allow for utility calls or other functions to modify data on a page of a different color. The components of the paging unit 130 may be implemented or combined in any fashion, such as by incorporating the inheritance logic 138 wholly or partially within the access logic 136 and/or comparison logic 134.

Embodiments of the present invention provide for assigning an attribute to memory pages to be used to associate specific pages with specific programs and data. The attribute is referred to as a page "color" and may be used to logically partition memory at a granularity fine enough to prevent one program from accessing the memory space of another program, or even parts of a single program from accessing the memory space of other parts of the same program. Techniques according to embodiments of the present invention may be implemented within existing page-based memory management data structures or nested page-based memory management data structures used by virtualization technologies, so that the use of embodiments of the present invention does not degrade performance due to additional memory accesses for retrieving color information. In some embodiments, for example, an indication whether a page of protected color is allowed to be readable by other colors may be incorporated into a "hidden bit" in a page table entry (PTE). Other techniques may include parallel page table structures that are retrieved from memory and loaded into their associated translation lookaside buffer ("TLB") hardware whenever a corresponding page table entry is fetched from memory. A TLB may be a buffer or cache in a CPU that contains parts of the page table which translate from virtual into real addresses and that may improve the speed of virtual address translation.

Translation logic 132 may perform address translations, such as the translation of a logical or linear address to a physical address; according to any known or future-developed page-based memory management technique. To perform address translations, translation logic 132 may refer to one or more data structures stored in processor 110, memory 120, other storage location in system 100 not shown in FIG. 1, and/or any combination of these components and locations. In some embodiments, the data structures may include page directories and page tables according to the architecture of the Pentium® Processor Family, as modified according to embodiments of the present invention, and/or a table stored in a TLB.

In one embodiment, translation logic 132 receives a linear address provided by an instruction to be executed by processor 110. Translation logic 132 may use portions of the linear address as indices into hierarchical tables, including page tables. The page tables may contain entries, each including a field for a base address of a page in memory 120. An entry may include, for example, bits 39:12 of a page table entry (PTE) according to the Pentium® Processor Family's Extended Memory 64 Technology. Any page size (e.g., 4 kilobytes) may be used within the scope of embodiments of the present invention. Therefore, the linear address used by a program to access memory 120 may be translated to a physical address used by processor 110 to access memory 120 by translation logic 132.

Comparison logic 134 may compare the page color of the page found by translation logic 132 to the page color of the page containing the instruction that provided the linear address. The comparison may be performed according to any known approach. A page color is an attribute of a page represented by a value stored in an entry in a data structure used by translation logic 132 to perform address translations. For example, a page color may be represented by an eight bit field in a page table entry, for example, bits 47:40 of a page table entry according to the Pentium® Processor Family's Extended Memory 64 Technology. Therefore, a color value for a page in this example may be any one of 256 values, similar to defining a color value for a pixel in a graphical display by using an eight bit field to provide an index into a 256 entry color table. As will be described in more detail subsequently, when inheritance logic is not utilized, the comparison logic 134 may compare the page color of the page containing the instruction, but when inheritance logic is utilized, the comparison logic 134 may instead compare the effective current page color of the page containing the instruction as the page inherits the color of the page calling the instruction.

Access logic 136 may use the result from comparison logic 134 to limit (i.e., prevent, restrict, or otherwise limit) or allow the instruction to access the page found by translation logic 132. In some embodiments, access logic 136 may allow the access when the page color of the page containing the instruction is the same as the page color of the page found by translation logic 132, and prevent or otherwise limit the access when the page colors are different. In embodiments where the page containing the instruction has an inheritance color, access logic 136 may allow the access when the effective current page color of the page containing the instruction is the same as the page color of the page found by translation logic 132 and prevent the access when the page colors are different. Limitation of access may include preventing access to all or part of a page, only allowing read-access while preventing write-access, or other limitations. Access-logic 136 may prevent the access by triggering a page fault exception.

Therefore, an operating system or other supervisor program may assign a certain page color to all pages from one program that it loads into memory, and a different page color to all pages from another program that it loads into memory, and so on, such that one program may not access pages associated with another program even if both programs reside within the same linear or logical address space. Different page colors may also be assigned to different parts of a single program, such that critical program components or data structures may only be accessed using special function calls or through specific entry points. When a function or data is described herein as having a color, it is substantially equivalent to saying that the memory page storing the function or data is assigned to the color. For example, the color of an instruction is the color of the page containing the virtual address from which the instruction was fetched. Similarly, the color of data is the color of the page containing the virtual address of the data. The supervisor program may also assign inheritance colors (which may include any colors so designated as having that functionality) for any programs that need access to other programs of different colors, such as system utility calls, library calls, or other functions.

Access logic 136 may determine whether to allow access based on additional criteria. For example, one color value (e.g., 0x00) may represent no color, such that a page marked with no color may be accessed by any other page. Also, a page table entry may include a field or bit, such as bit 48 of a page table entry according to the Pentium® Processor Family's Extended Memory 64 Technology, which defines whether the page is hidden. The bit may be set to zero to allow any other page to read from the referenced page, regardless of the result of the color comparison, or set to one to enable access logic 136 to prevent or allow read accesses based on the color comparison. Access logic 136 may also determine whether to allow access based on instruction control flow. For example, an instruction may be used to mark allowed entry points to a program. In an embodiment according to the architecture of the Pentium® Processor Family, a new instruction (e.g., a "Directed Address Vector" or "DAV" instruction) may be added for this purpose. If a jump or other control flow instruction is executed from a page of one color to a DAV instruction in a page of another color, the access will be allowed. However, if the jump is to a page of another color but not to a DAV instruction, the access will not be allowed. Therefore, the DAV instruction may be used to allow entry into a program only at an expected point which may provide a defined, secure interface. Jumps to random or unexpected sections of a program from a program of another color may be prevented. The DAV instruction may also use a variable parameter to perform a color comparison to determine if a program of an expected color is attempting to access the program implementing the DAV identified entry point. Finally, the DAV instruction may only be executed in pages that are executable (e.g., not eXecute Disabled using the XD bit according to the architecture of the Pentium® Processor Family), assuring that data pages with spurious bit sequences appearing to be a DAV instruction will not be executed by the processor.

Access logic 136 may also be used to implement special coloring techniques. In one embodiment, a special page color (e.g., 0xFF) may be allocated for operating system components that are allowed to jump into any portion of a program of another color. A jump instruction from a page of this color may always be allowed by access logic 136. This color may be used by operating system schedulers and interrupt service routines to allow them to resume execution of an interrupted program from the point of interruption without incurring a page fault. A page of this color may not have write access to pages of another color or read access to hidden pages of another color. In another embodiment, special colors may be used for supervisor pages that have full read and write access to pages of other colors. These special supervisory colors may be used by operating system components to verify other programs and modify their contents when required. Other colors may be associated with access to restricted processor registers, restricted processor instructions, or advanced programmable interrupt controller ("APIC") associated memory locations. Only programs colored with a privileged color would be able to access the restricted processor features associated with the privileged color. In another embodiment, a page marked with no color, as discussed above, may not be protected from pages of other colors or other pages with no color. Pages that are assigned a color, however, may not be write- or jump-accessible by pages with no color.

Furthermore, access logic 136 may also report whether a page fault was caused by a page color mismatch or violation. For example, a bit in a page fault error code (e.g., bit 5 of the page fault error code pushed onto the stack according to the architecture of the Pentium® Processor Family) may be designated as a page color violation bit, to be set to one to indicate that the page fault was triggered by a color mismatch. This bit may be interpreted in the context of other flags. For example, if the page color violation was caused by an instruction fetch, an instruction fetch bit in the error code may be set to one. If the page color violation was caused by a read or a write, a read/write bit may be set to a zero for a read or a one for a write. Additionally, the linear address of the page that caused the fault may be saved, for example in the CR2 control register of a processor according to the architecture of the Pentium® Processor Family.

Inheritance logic 138 may determine an effective current page color for a page to facilitate inheritance of a color from another page to allow for utility calls or other functions to modify data on a page of a different color. To accomplish this (and as will be described in more detail subsequently), the inheritance logic 138 may determine an effective current page color (ECPC) for an instruction currently being executed. For instructions that are colored with an inheritance color (which may also be known as a "chameleon" color), the inheritance logic 138 may determine that the ECPC is equivalent to the color of the page calling the instruction and set the ECPC to that value, allowing the instruction to "inherit" the color of the page calling it. The comparison logic 134 and the access logic 136 may utilize the ECPC in determining access of data structures, allowing the instruction to access pages the same color as the calling page and thus allowing the instruction to modify or otherwise access the data of the requesting page. For instructions that are not colored with an inheritance color, the ECPC may be set as the current page color and the instruction may only modify data with its own color as it does not inherit another color.

Without utilizing color inheritance, the page coloring technique may have difficulties in making traditional system utility calls or other calls that modify the data structures that belong to the caller (e.g., memcpy, strcpy, stat, etc.). System utility calls that modify data structure belonging to the caller are typically invoked with a pointer argument that contains the memory addresses of the data structure to be modified. The callee function (i.e., the utility function) may then modify the contents of the data structure to achieve the desired result. Typically, the data structure to be modified is owned by the caller and hence is colored in the same color as that of the caller. As a result, the data structures to be modified or otherwise accessed will be colored in the caller's color while the utility function is colored in a different color, resulting in the comparison logic 134 and access logic 136 denying access to the page. For the utility function to be able to modify the data structure, however, the utility function would need to be either in the same color as the caller or in a supervisory color, as described previously. A utility function usually cannot be colored the same color as various callers as each may be in a different color, making that solution undesirable. Giving supervisory colors to utility functions, on the other hand, allows the utility functions to work satisfactorily but may increase the possibility that a malicious caller could leverage the function to launch attacks against other modules, as supervisory colored functions may have read/write access to every page in the system. Even if system utility functions are written to check for such attacks, attackers could potentially exploit bugs in such utility functions to attack other components. Additionally, such checks would result in performance degradation.

To accommodate utility calls, the disclosed system, including inheritance logic 138, may facilitate system utility calls and other functions taking on, or inheriting, the color of the requesting function caller for purposes of performing the instruction. The disclosed system may thus extend the functionality of a page coloring system to efficiently and effectively handle utility functions. This allows the utility function to be compatible with callers with a variety of associated colors as the color of the utility function may adapt to each. In some embodiments, the set of registers may be replicated on each CPU hardware thread (e.g., multiple threads in Symmetric Multi Threading processors such as Intel® Pentium family processors, or multiple cores from multi-core processors such as Intel® Pentium D, Intel® Core Duo, and Intel® Core 2 Duo processors), making the disclosed system thread-safe as different colored threads could call into the same utility function simultaneously. The disclosed system may also eliminate the need to provide supervisory colors to utility functions, potentially reducing security risks of the system 100 by reducing the chance of problems and limiting the damage that bugs in such functions or attacks to the functions could cause. Accordingly, function calls to utility functions that modify the caller's data structure may be accomplished without having to recolor the data structures that will be modified.

Processor 110 may also include registers such as a previous page color (PPC) register 140, a current page color (CPC) register 142, and an effective current page color (ECPC) register 144 to supports its functions, as well as other storage locations. PPC register 140, which may also be known as a previous different page color (PDPC) register, may support transitioning from one program to another program, as described above using the DAV instruction. Previous page color and previous different page color may be considered interchangeable herein. Access logic 136 may detect a mismatch in page color when processor 110 begins fetching instructions from a page of a different color than the currently executing instruction. Access logic 136 may allow this fetching according to the DAV instruction protocol discussed above, and allow the page color to change, but save the previous page color in PPC register 140. Therefore, instructions from the new page may query PPC register 140 to determine the previous page color, so that programs may control access to their services by determining which programs of differing colors are allowed to access the presently executing program at a particular DAV defined entry point. Transitions caused by pages of special color may not be stored in PPC register 140, so an operating system scheduler induced transition need not be noted as a page color transition, but rather as an interrupt and return. The CPC register 142 may hold the color of the page to which the current value of the instruction pointer points (i.e., the color of the page containing the instruction being executed). The ECPC register 144 may hold the effective color of the instruction currently being executed, as described in more detail in relation to FIG. 3. The color stored in the ECPC register 144 may be used to make access control decisions instead of the PPC register 140 color in a system without color inheritance. Thus, in some embodiments, an instruction may only modify data if the color stored in the ECPC register 144 matches the color of the data to be accessed.

Figure 2:
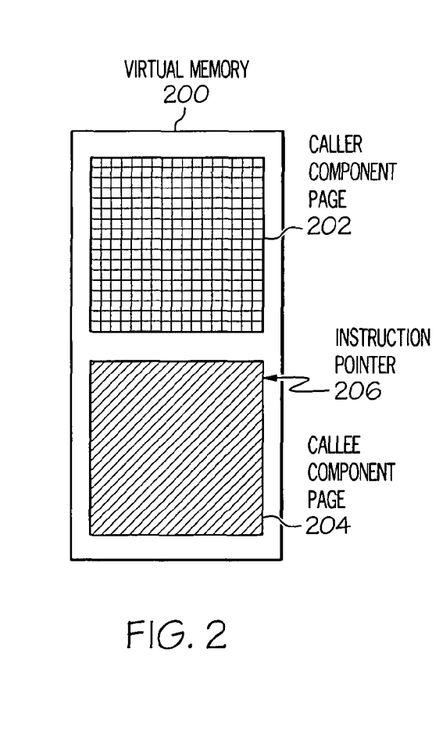
FIG. 2 depicts a conceptual illustration of a virtual memory configuration with a plurality of pages according to some embodiments.

FIG. 2 depicts a conceptual illustration of a virtual memory configuration with a plurality of pages according to some embodiments. Virtual memory 200 may include a caller component page 202 that is colored with a protected color. Protected colors may be a set of colors that are protected from each other, as described previously, such that code may only modify data of the same color. Caller component page 202 may represent a group of one or more virtual memory pages (i.e., program code) that belong to a single software component, such as a driver. Virtual memory 200 may also include a callee component page 204 with an instruction pointer 206 that points to an instruction currently being executed (that was requested by code of the caller component page 202). Instruction pointer 206 may include, for example, register instruction pointers (RIPs) or extended instruction pointers (EIPs).

Callee component page 204 may represent a group of one or more virtual memory pages that belong to a single software component, such as a utility call or a memory call. The callee component page 204 may be colored with an inheritance, or chameleon, color, as described previously. The inheritance color may inherit the color of the caller component page 202 during processing of the call to the callee-component page 204. In one example, a caller component page 202 that is colored "GREEN" may call the callee component page 204 that is colored "RED". If "RED" is not an inheritance color, the callee code may not be able to modify or otherwise access data of the caller component page 202. If "RED" is an inheritance color, the callee component page 204 will inherit the color "GREEN", allowing the callee code to access and modify date of the caller component page 202.

Figure 3:
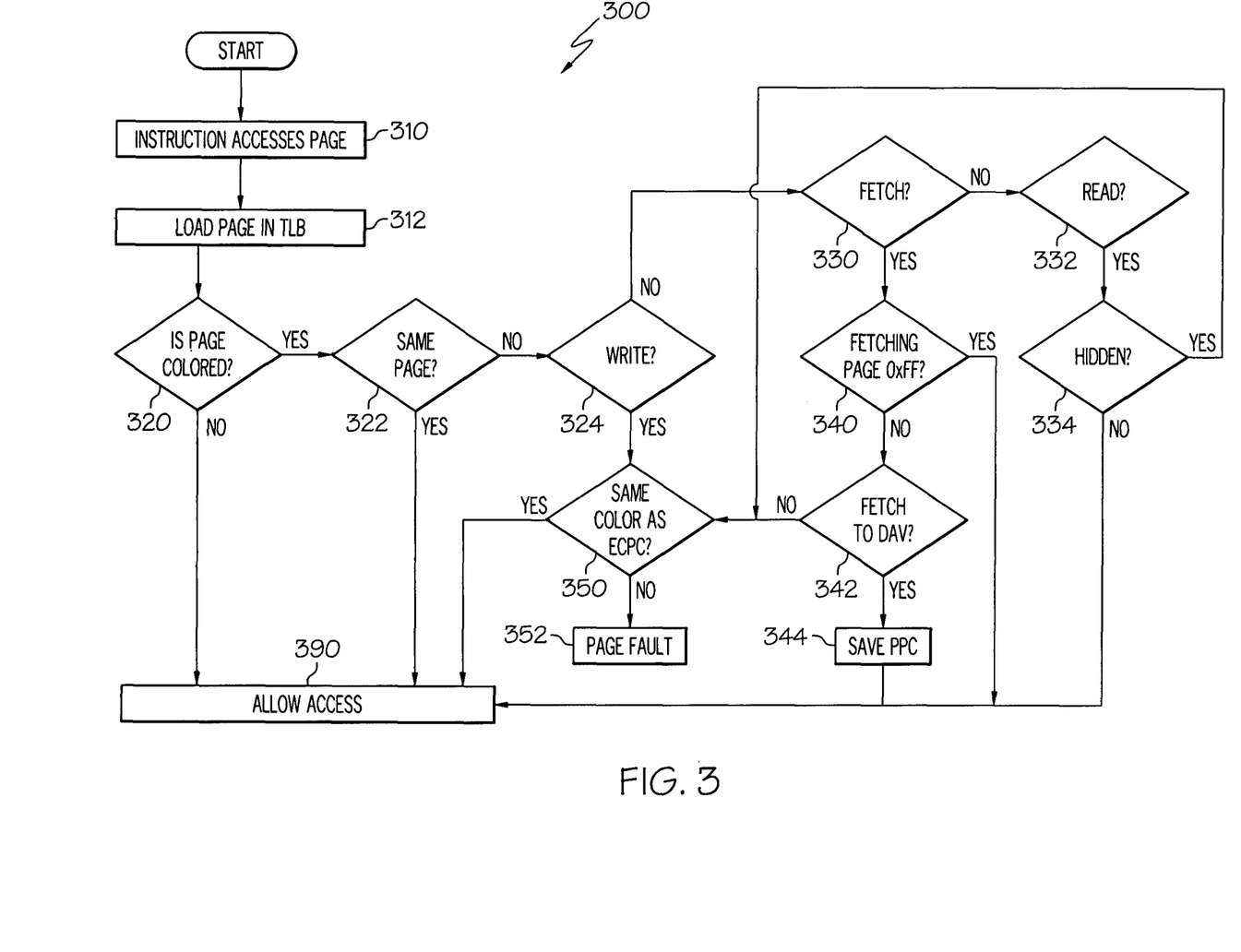
FIG. 3 depicts a flowchart of an embodiment of a method for page coloring to associate memory pages with programs utilizing inheritance colors.

FIG. 3 depicts a flowchart of an embodiment of a method for page coloring to associate memory pages with programs utilizing inheritance colors. In one embodiment, one or more components of the processor 110, such as the paging unit 130 and its components, may perform the elements of flowchart 300. Flowchart 300 begins with element 310, where an instruction attempts to access a page in memory. At element 312, the page is loaded into a TLB, and the color and permissions of the page are noted. At decision block 320, a determination is made as to whether the page to be accessed is colored (e.g., color value is not 0x00). If it is not colored, then, at element 390, the access to the page is allowed. If, at decision block 320, the page to be accessed is colored, then, at decision block 322, a determination is made as to whether the page is the page that contains the instruction. If so, then, in block 390, the access to the page is allowed at element 390. If not, then, at decision block 324, a determination is made as to whether the access is a write.

If, at decision block 324, the access is a write, then, at decision block 350, a determination is made as to whether the page is the same color as the page containing the accessing instruction. Using a page coloring system-without color inheritance, the determination of decision block 350 may be based on a comparison between a current page color (the color of the page containing the accessing instruction) and the color of the page to be accessed. Under the disclosed system with color inheritance, the determination of decision block 350 may be based on a comparison of the effective current page color for the determination of whether access is granted. For instructions with inheritance colors, their effective current page color may be the same as the color of the page to be accessed. If the effective current page color is not the same color as the page, then, access is prevented by triggering a page fault at element 352; if so, access to the page is allowed at element 390. In this fashion, a utility call or other instruction that has been assigned an inheritance color may access data associated with a calling function.

If, at decision block 324, the access is not a write, then, a decision block 330, a determination is made as to whether the page access is due to an instruction fetch. If not, then, at decision block 332, a determination is made as to whether the access is a read. If the access is a read, then, at decision block 334, a determination is made as to whether the page's hidden bit is set. If the hidden bit is not set, then, at element 390, the access to the page is allowed. If the hidden bit is set, then, at decision block 350, a determination is made as to whether the page is the same color as the page containing the accessing instruction (which may use the effective current page color of the page containing the accessing instruction), as described previously. If not, then, at element 352, the access is prevented by triggering a page fault. If so, then, at element 390, the access to the page is allowed.

Returning to decision block 330, if the page access is due to an instruction fetch, then, at decision block 340, the color of the page containing the fetch instruction is checked to determine whether it is allowed to jump to pages of another color (e.g., its color is 0xFF). If so, then access to the page is allowed at element 390. If not, then, at decision block 342, a determination is made as to whether the fetched instruction is a DAV instruction. If so, then, at element 344, the page color of the fetching instruction is saved in the PPC register 140, and access to the page is allowed at element 390. If not, then at decision block 350, a determination is made as to whether the page is the same color as the effective current page color of the page containing the accessing instruction. If not, access is prevented by triggering a page fault at element 350 and if so, access to the page is allowed at element 390.

Figure 4:
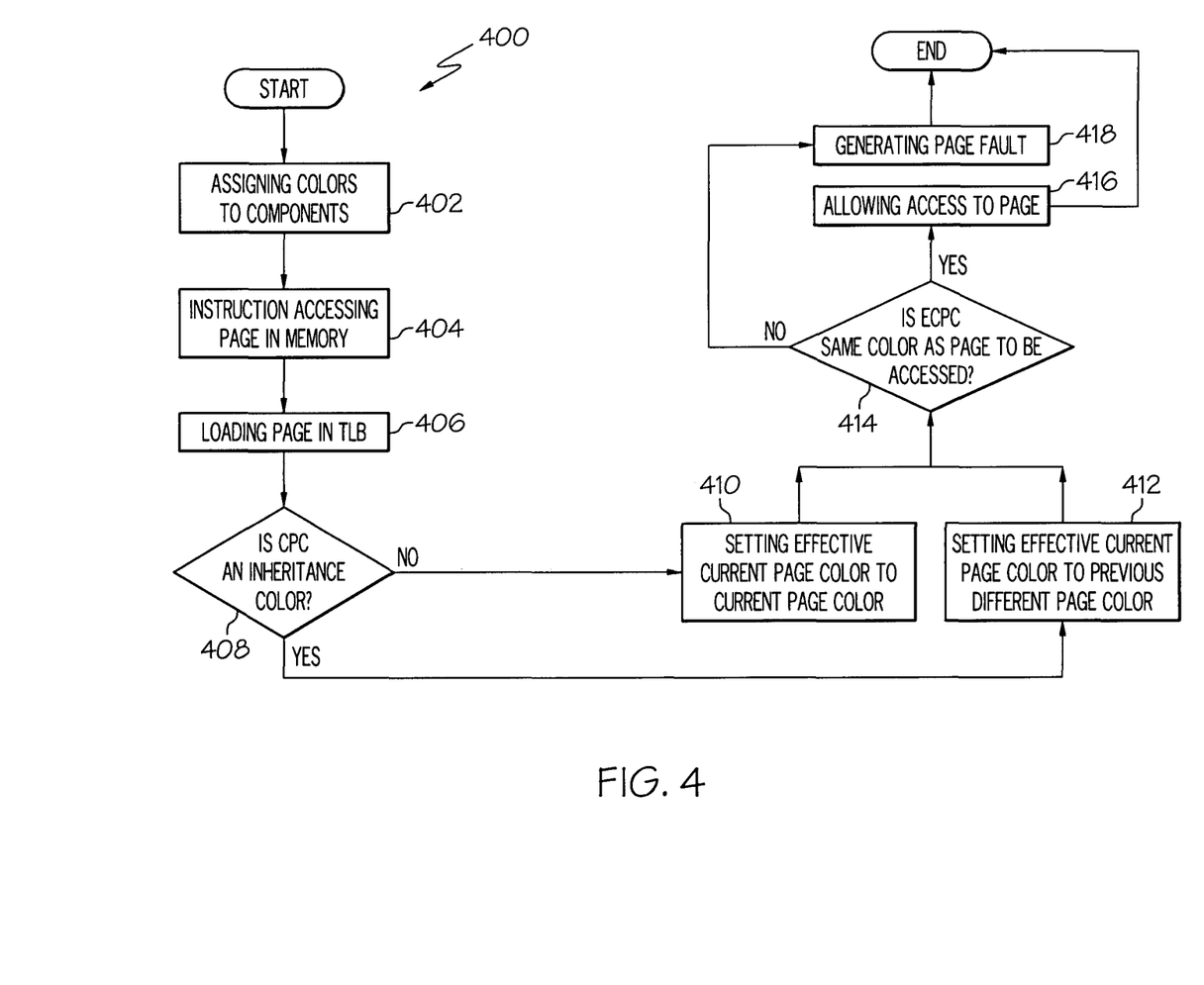
FIG. 4 depicts a flowchart of an embodiment of a method for page coloring to associate memory pages with programs utilizing inheritance colors.

FIG. 4 depicts a flowchart of an embodiment of a method for page coloring to associate memory pages with programs utilizing inheritance colors. In one embodiment, one or more components of the processor 110, such as the paging unit 130 and its components, may perform the elements of flowchart 400. Flowchart 400 may begin with optional element 402, assigning colors to components. Element 402 may be performed, for example, to initialize page coloring to associate memory pages with programs. An operating system loader may load various components of an operating system into memory and assign them different protected page colors. In one example, the operating system loader may load drivers from a disk, integrity check the drivers by validating vendor signatures, and assign page colors to them to protect them from other kernel components. Components such as system utility calls may be assigned an inheritance colors according to the disclosed embodiments so that the components may access protected colors upon request from instructions of those colors.

At elements 404 and 406, an instruction may attempt to access a page in memory and the page may be loaded in the TLB, similarly to elements 310 and 312, respectively, of FIG. 3. The instruction may have a first color and may attempt to access a page in memory having a second color. The instruction color (i.e., the color of the page from which the instruction was fetched) may be stored in the CPC register 142 as the current page color. The color of the page requesting the instruction may be stored in the PPC register 142 as the previous page color (or previous different page color). The previous page color may also be the color of the page in memory to be accessed by the instruction.

The inheritance logic 136 of the paging unit 130 may next determine the effective current page color. At decision block 408, the inheritance logic 136 may determine whether the current page color (i.e., the instruction color) is an inheritance color in the system 100. A system 100 may have one or more inheritance colors that inherit the color of the calling code. A system 100 with multiple inheritance colors may, for example, have different inheritance colors for different groups of protected colors or programs. In other embodiments, only one inheritance color is needed. If the current page color is not an inheritance color, the inheritance logic 136 may set the effective current page color (ECPC) in the ECPC register 144 to the current page color. If the current page color is an inheritance color, the inheritance logic 136 may set the ECPC to the previous different page color from the PPC register 140. By utilizing the value from the PPC register 140, the instruction may thus inherit the color of the code that is calling the instruction.

Once the ECPC has been set, the paging unit 130 and its components may determine whether to allow access by the instruction to the page of memory. Elements 414, 416, and 418 may accomplish this task, after which the method terminates. The elements of FIG. 3 may represent one embodiment of accomplishing elements 414, 416, and 418, and their description will not be repeated in the interest of brevity. At decision block 414, the comparison logic 134 may determine whether the ECPC color is the same as the color of the page to be accessed. If the ECPC color is the same as the page color, the access logic 136 may allow access to the page at element 416, after which the method terminates. If the ECPC color is different, the access logic 136 may deny access to the page by, for example, generating a page fault at element 418, after which the method terminates.

As an example, caller code that is colored "GREEN" in a protected color may call a utility function (i.e., the callee) that is colored an inheritance color of "VIOLET". When the "GREEN" caller calls the utility function, the PPC register 140 gets set to "GREEN" because of the color transition. The CPC register 142 gets set to "VIOLET", the inheritance color. Since "VIOLET" is an inheritance color, the ECPC register 144 may get set to "GREEN", the previous different page color, at element 412. Thus, for the purpose of access-control enforcement at elements 414, 416, or 418 (or FIG. 3), the utility function has an effective color of "GREEN" and may thus access the pages and data structures of the caller. The utility function in this example, however, may not access other data structures with protected colors that are not "GREEN", preventing the caller from using the callee to launch attacks against other colors. The utility function may, however, inherit the colors of other callers when requested by the associated caller codes so that it may access their data structures.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Processor 110, or any other processor or component designed according to an embodiment of the present invention, may be designed in various stages, from creation to simulation to fabrication. Data representing a design may represent the design in a number of manners. First, as is useful in simulations, the hardware may be represented using a hardware description language or another functional description language. Additionally or alternatively, a circuit level model with logic and/or transistor gates may be produced at some stages of the design process. Furthermore, most designs, at some stage, reach a level where they may be modeled with data representing the physical placement of various devices. In the case where conventional semiconductor fabrication techniques are used, the data representing the device placement model may be the data specifying the presence or absence of various features on different mask layers for masks used to produce an integrated circuit.

Program code may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible medium through which electrical, optical, acoustical or other form of propagated signals or carrier wave encoding the program code may pass, such as antennas, optical fibers, communications interfaces, etc. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. Program code may be used by or in conjunction with embedded controllers. In addition, in some embodiments the order of operations may be rearranged without departing from the spirit of the disclosed subject matter. Within the scope of the present invention, methods 300 and 400 may be performed in different orders, with illustrated elements performed simultaneously, with illustrated elements omitted, with additional blocks elements, or with a combination of reordered, combined, omitted, or additional elements.

It will be apparent to those skilled in the art having the benefit of this disclosure that the present invention contemplates page coloring with color inheritance for memory pages. It is understood that the form of the invention shown and described in the detailed description and the drawings are to be taken merely as examples. It is intended that the following claims be interpreted broadly to embrace all the variations of the example embodiments disclosed. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An apparatus comprising:
   an interface to access a memory, the memory to comprise at least a calling page, a first page, and a second page; and
   a paging unit comprising:
   translation logic to receive a first address associated with the first page from the calling page having a particular page color and to translate, based on an entry in a data structure, the first address to a second address, wherein the entry is to comprise the second address and a color of the second page, wherein page colors associate memory pages with programs;
   inheritance logic to determine an effective current page color of the first page based on a color of the first page by setting the effective current page color of the first page equal to the particular page color of the calling page in response to receiving the first address;
   comparison logic to compare the effective current page color of the first page to the color of the second page; and access logic to limit access to the second page by an instruction of the first page if the effective current page color of the first page and the color of the second page are different.

2. The apparatus of claim 1, wherein the access logic limits the instruction of the first page from accessing the second page by preventing all access of the second page, preventing access to part of the second page, or preventing write access of the second page.

3. The apparatus of claim 1, wherein the access logic is to limit the instruction of the first page from accessing the second page by triggering a page fault exception.

4. The apparatus of claim 1, further comprising access logic to allow the instruction of the first page to access the second page if the effective current page color of the first page and the color of the second page are the same.

5. The apparatus of claim 1, further comprising a storage location to store the effective current page color of the first page.

6. The apparatus of claim 1, further comprising a storage location to store the color of the first page.

7. The apparatus of claim 1, further comprising a storage location to store a previous different page color.

8. The apparatus of claim 1, wherein the instruction of the first page is part of a system utility call.

9. A method comprising:
receiving a first address associated with a first page from a calling page having a particular page color;
setting the effective current page color of the first page equal to the particular page color of the calling page in response to receiving the first address;
comparing an effective current page color of a first page to a color of a second page; and
allowing an instruction from the first page to access the second page if the effective current page color of the first page is the same as the color of the second page.

10. The method of claim 9, further comprising limiting the instruction from accessing the second page in the event the effective current page color of the first page is different from the color of the second page.

11. The method of claim 9, further comprising referencing a page table to find the color of the second page.

12. The method of claim 9, wherein the instruction from the first page is part of a system utility call.

13. A system comprising:
a dynamic random access memory, the memory to comprise at least a calling page, a first page, and a second page; and
a processor in communication with the memory, comprising:
translation logic to receive a first address associated with the first page from the calling page having a particular page color and to translate, based on an entry in a data structure, the first address to a second address, wherein the entry is to comprise the second address and a color of the second page;
inheritance logic to determine an effective current page color of the first page based on a color of the first page by setting the effective current page color of the first page equal to the particular page color of the calling page in response to receiving the first address;
comparison logic to compare the effective current page color of the first page to the color of the second page; and
access logic to limit access of the second page by an instruction of the first page if the effective current page color of the first page and the color of the second page are different.

14. The system of claim 13, further comprising access logic to limit the instruction from accessing the second page if the effective current page color of the first page and the color of the second page are different.

15. The system of claim 14, wherein the access logic is to limit the instruction from accessing the second page by triggering a page fault exception.

16. The system of claim 13, further comprising access logic to allow the instruction to access the second page if the effective current page color of the first page and the color of the second page are the same.

17. The system of claim 13, wherein the dynamic random access memory is to store the data structure.

18. An article comprising a non-transitory machine-readable storage medium that contains instructions, which when executed by a processing platform, cause said processing platform to perform operations comprising:
receiving a first address associated with a first page from a calling page having a particular page color;
setting the effective current page color of the first page equal to the particular page color of the calling page in response to receiving the first address;
comparing an effective current page color of a first page to a color of a second page; and
allowing an instruction from the first page to access the second page if the effective current page color of the first page is the same as the color of the second page.

19. The machine-readable medium of claim 18, further comprising limiting the instruction from accessing the second page in the event the effective current page color of the first page is different than the color of the second page.

* * * * *